(12) United States Patent
Dugger

(10) Patent No.: US 8,096,025 B2
(45) Date of Patent: Jan. 17, 2012

(54) ADJUSTABLE, REUSABLE RIGGING

(76) Inventor: John Dugger, Albany, CA (US)

( * ) Notice: Subject to any disclaimer, the term of this patent is extended or adjusted under 35 U.S.C. 154(b) by 1024 days.

(21) Appl. No.: 12/011,896

(22) Filed: Jan. 29, 2008

(65) Prior Publication Data

US 2008/0184532 A1 Aug. 7, 2008

Related U.S. Application Data

(60) Provisional application No. 60/899,820, filed on Feb. 5, 2007.

(51) Int. Cl.
*A44B 99/00* (2010.01)
(52) U.S. Cl. .............................. 24/298; 24/197
(58) Field of Classification Search ............ 24/197, 24/298, 300–302
See application file for complete search history.

(56) References Cited

U.S. PATENT DOCUMENTS 4,315,655 A * 2/1982 Machnik .................. 297/118
5,896,623 A * 4/1999 Martin ..................... 24/16 PB

* cited by examiner

*Primary Examiner* — James Brittain
(74) *Attorney, Agent, or Firm* — Howard Cohen

(57) ABSTRACT

A method and apparatus for affixing, rigging or attaching objects, articles or vessels using a fabric case, two double O-ring sets and a cord with two adjustable loops each with a bead stopper or chock. The fabric case serves as a semi-rigid cladding sleeve within which the attached cord extends, making two loops, one each at the opposite ends, each with a threaded bead or chock. Using the bead, the cord loop is passed about and object and returned under two adjacent O-rings, then back over one and under the other of the same O-ring pair to secure the cord loop by means of pressure against the fabric case. In this manner, the semi-rigid fabric cladding sleeve serves as the support base for the pressure or tensioning of the double O-rings and works to fasten or rig the attached objects, articles, or vessels.

6 Claims, 2 Drawing Sheets

ADJUSTABLE, REUSABLE RIGGING

CROSS-REFERENCE TO RELATED APPLICATIONS

This utility application claims the priority benefit of the filing date of U.S. Provisional Application 60/899,820, filed Feb. 5, 2007.

FEDERALLY SPONSORED RESEARCH

Not applicable.

SEQUENCE LISTING, ETC ON CD

Not applicable.

BACKGROUND OF THE INVENTION

1. Field of the Invention

This invention relates to apparatus for releasably securing objects together and, more particularly, to rigging devices that are simple to use without requiring skills in knots and knot-tying.

2. Description of Related Art

There are known in the prior art various means for attaching banners or fabric displays, including plastic pull-ties or clamping devices. Plastic pull-ties are popular as they are inexpensive and certainly easy to use, but they cannot be reused or loosened, and they can injure the banner or fabric display by bunching and require a sharp blade or knife to cut loose, thereby chancing a cut or injury to the person cutting the pull-tie open. Clamping devices likewise can injure the fabric of a banner or fabric display and are mostly clumsy and unwieldy, requiring special tools or a railing to which the clamp may be secured.

Years of experience in the banner and flag industry have shown that many persons cannot tie effective knots. This may be due in part to the fact that knot-tying is becoming a lost art, or that an aging populace is prone to medical conditions that adversely affect manual dexterity. Moreover, there are few simple and temporary attachment or rigging devices that are lightweight, easy to use, reusable and attractive to the viewer and user, particularly in fields such as on-site installation of banners, fabric displays, curtains and artworks.

BRIEF SUMMARY OF THE INVENTION

The present invention generally comprises a rigging device and a method for using it to releasably join two objects in a simple, secure manner without requiring knots or knot-tying.

The apparatus for affixing, rigging or attaching objects, includes a fabric case, two double O-ring sets and a cord with two adjustable loops, each loop having a bead stopper or chock. The fabric case serves as a semi-rigid cladding sleeve within which the attached cord extends, making two loops, one each at the opposite ends, each with a threaded bead or chock. Using the bead, the cord loop is passed about an object to be joined and back toward and under and through the two O-rings; then back over one and under the other of the same O-ring pair to secure the cord loop by means of pressure against the fabric case. In this manner, the semi-rigid fabric case, or cladding sleeve, serves as the support base for the pressure or tensioning of the double O-rings and works to fasten or rig the attached objects, articles, or vessels.

The rigging unit is flexible, moving with the object rigged or attached and this movement tends to tighten the pressure connection provided by the double O-ring configuration. This flexibility also allows it to bend around corners or over edges or provide a rigging point at 90°, or other angles, to the object being rigged or secured. This flexibility is important in rigging fabric displays, in that it enables banners or flags or fabrics to move slightly in the wind, thereby reducing kinetic energy, or to break away, if placed under overly forceful wind pressure, as a safety feature.

The cord loop at each end of the sleeve is comprised of two legs extending generally in parallel. When a loop is passed about an object and then secured to the O-rings, the loop consists of the two legs extending in parallel, so that the strength of the rigging is substantially twice the strength of the cord used therein.

The invention is especially helpful to those people who cannot tie knots and therefore have difficulties rigging a banner or fabric display or tying loads to other objects. By simply looping the cord through, or around, the point of attachment on a banner or fabric display or object, and back through the double O-ring configuration, the device may be tied to an object. The other end may be joined in a similar manner to another object to join the two objects temporarily and securely. Releasing the objects involves a simple reversal of the steps required to join the objects, and is very quick, particularly in comparison to untying difficult or complex or tangled knots.

Although this invention is described herein with general reference to rigging banners, fabric displays and curtains, it has far wider applications as a general adjustable attachment device for uses in various sports, camping and backpacking, nautical uses on a boat or yacht, underwater uses in diving or fishing, for carrying objects or securing ropes or spars together, as a personal carrying device for bulky or bundled objects.

DETAILED DESCRIPTION OF THE INVENTION

Figure 1:
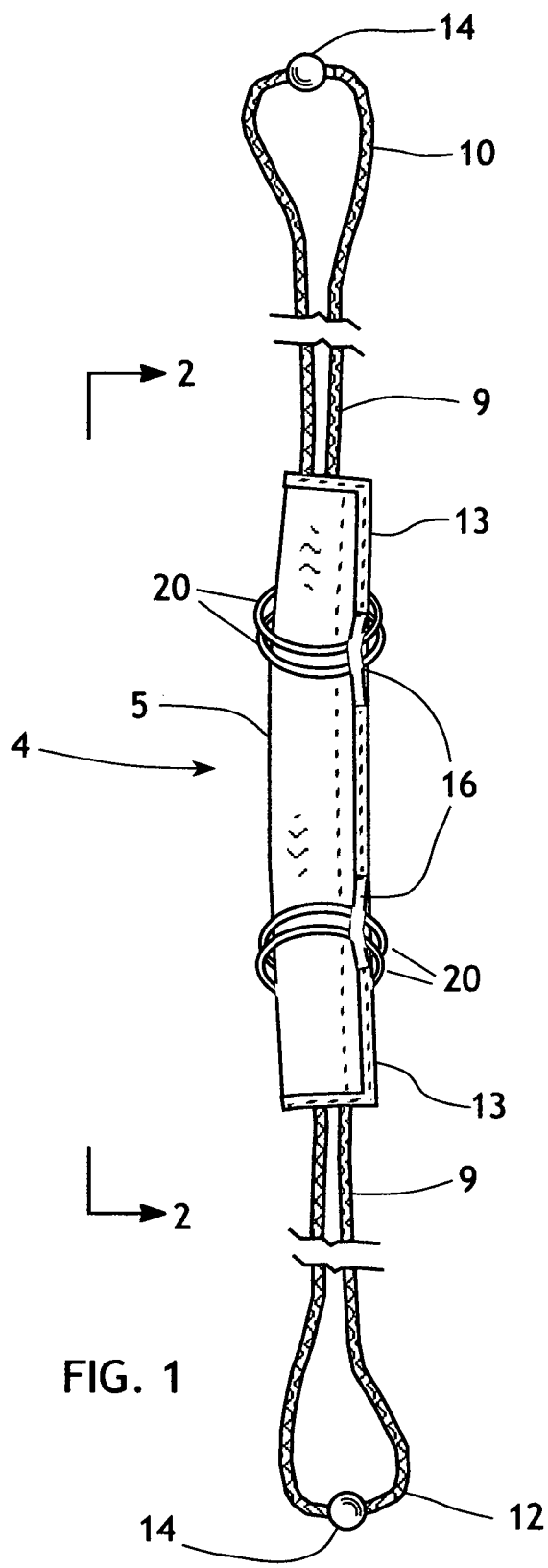
FIG. 1 is a plan view of the rigging device of the present invention, shown in a laid-out, unattached disposition.
Figure 2:
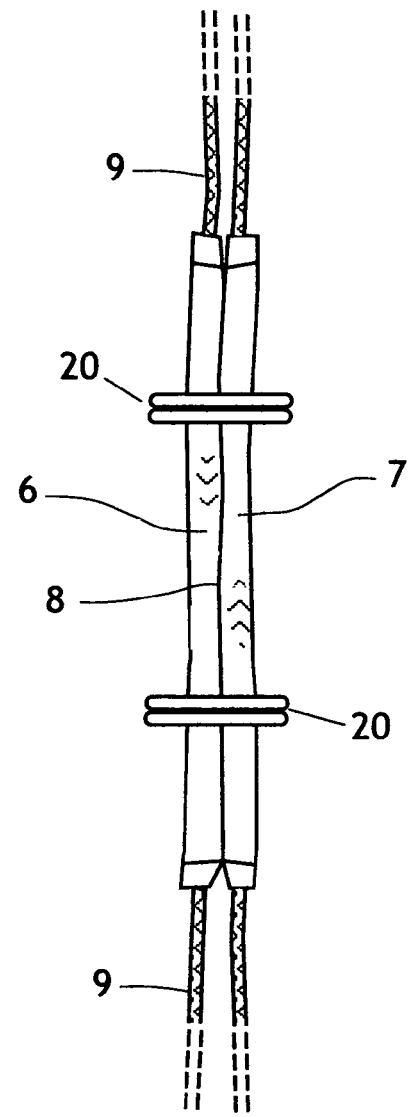
FIG. 2 is a side view of the rigging device of the present invention, taken along line 2-2 of FIG. 1.

The present invention generally comprises a rigging device for releasably joining two objects in a simple, secure manner without requiring knots or knot-tying. With regard to FIGS. 1 and 2, the rigging device 4 includes a fabric sleeve 5 that is stitched or otherwise secured along its length to provide a pair of longitudinally extending passages 6 and 7 which extends for the length of the sleeve. The two passages are parallel to each other and separated by a longitudinal line of stitching 8 that defines a common border of the two passages. A continuous cord 9 has its ends (not shown) fastened within one of the passages, and the cord extending from an the end of one passage describes a U-turn and enters the like end of the adjacent passage, thus describing cord loops 10 and 12 at longitudinally opposed ends of the assembly. The loops 10 and 12 are end portions of a single unitary cord loop. One leg of the cord (the one without the fastened cord ends) is disposed to slide freely through its respective passage, whereby one loop 10 or 12 may be made larger, while the other loop 12 or 10 is made concomitantly smaller. This feature provides adjustability in securing objects that range from small to large circumferences.

Note that a bead or chock 14 is secured to each loop 10 or 12, and is slidably secured on the cord thereof. The sliding bead 14 enables the user to easily engage and control the cord by grasping the bead through which the cord passes. And pulling on the bead automatically causes the bead to slide along the cord loop (10 or 12) until the legs of the loop are equal in length; i.e., the bead is disposed at the distal-most point of the loop 10 or 12. This function of the sliding bead enhances the utility and simplicity of the rigging invention, as described below.

Secured to sleeve 5 is a length of binding tape 13 extending substantially for the length of the sleeve. The tape includes a pair of loop portions 16 formed therein by the sewing seams, and spaced generally equally between a midpoint of the longitudinal extent of the sleeve 5 and the opposed ends thereof. A pair of O-rings 20 pass through each loop 16 and is secured therein in closely adjacent fashion.

Figure 3:
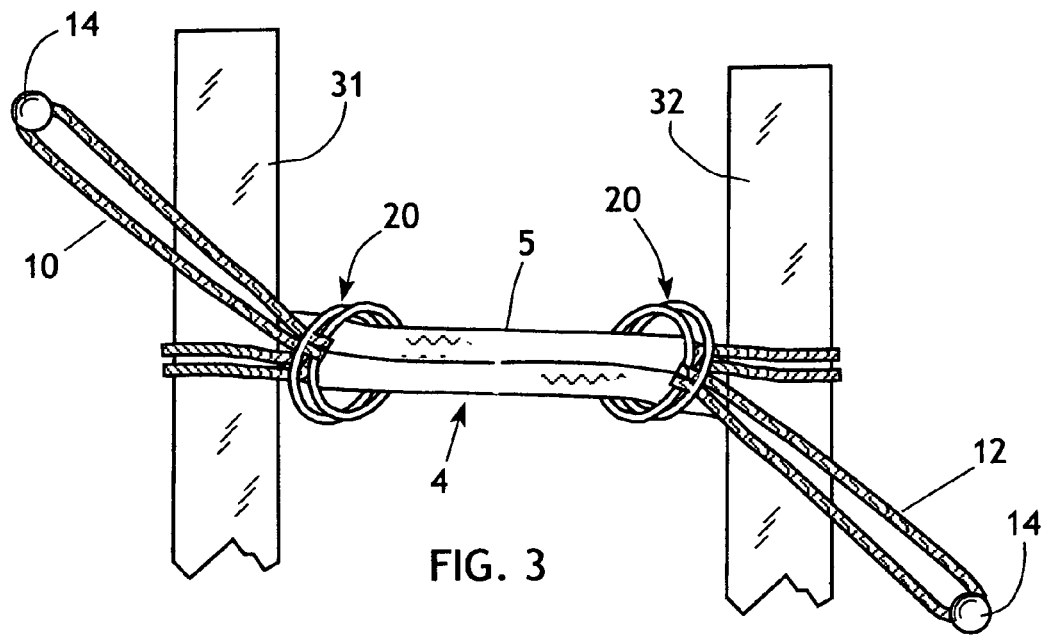
FIG. 3 is a perspective view of the rigging device of the present invention, shown secured to two objects at the ends of the rigging device.

With reference to FIG. 3, the utility of the rigging device 4 is illustrated in joining two spar-like objects 31 and 32. The twinned legs of each loop 10 and 12 are wrapped about a respective object 31 and 32, and passed back through the interior of both of the rings 20 that are adjacent to the loop 10 or 12. Each loop is then passed around one of the rings 20 and through the other adjacent ring 20, and the loop is pulled tight by grasping the bead 14 and pulling on it. The tension on the cord tends to urge the two rings to impinge where the loop is passed thereabout, and the impinging rings tend to clamp against the cord loop and immobilize it. Thus the objects 31 and 32 are joined to the rigging device 4, and thus to each other.

The loops 10 and 12 may be joined to any object that has a circumference capable of being circumscribed by the twinned legs of the loop 10 or 12. Note that the length of either loop may be adjusted by sliding a portion of the cord 9 from one loop 10 or 12 through the sleeve 5 to extend into the other loop 12 or 10. Thus the rigging device is capable of a wide range of adjustability to objects of differing sizes. Note also that more than one object may be secured within a single loop 10 or 12, so that there is the potential of joining more than two objects using one rigging device 4.

Figure 4:
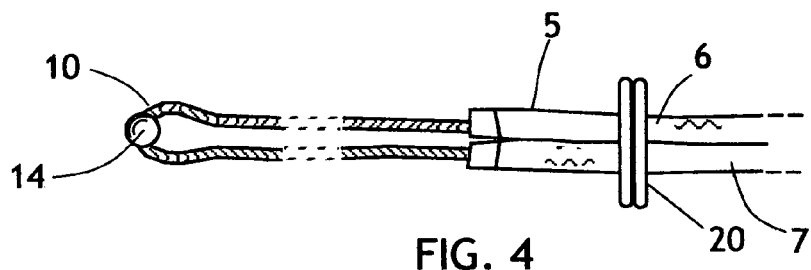
FIGS. 4-6 are a sequence of magnified side views depicting the steps in securing one object to one end of the rigging device of the invention.
Figure 5:
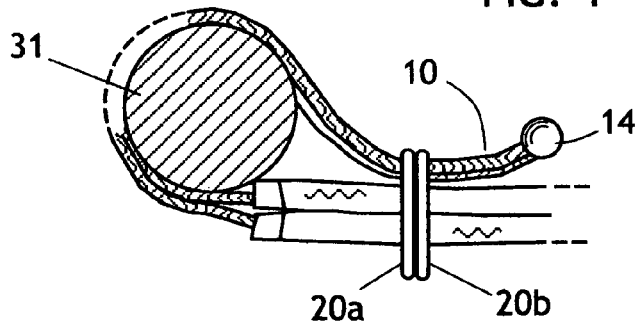
Figure 6:
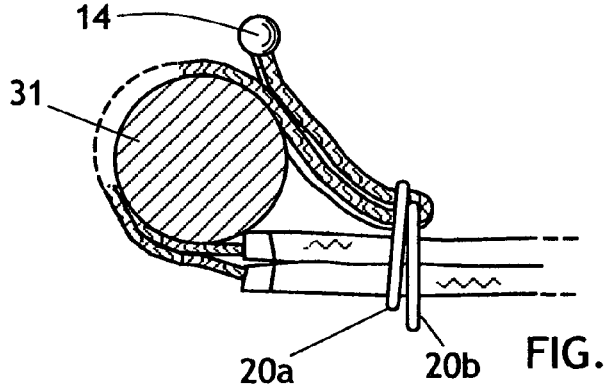

The method for using the rigging device 4 is detailed in FIGS. 4-6. As shown in FIG. 4, either loop 10 or 12 is pulled taut by grasping the bead 14 and pulling away from the sleeve 5, so that the two legs of the loop extend in generally parallel fashion from the sleeve 5 to the bead 14. The twin parallel legs of loop 10 (as shown in FIGS. 4-6) are then wrapped about a circumference of the object 31 and returned to pass through the aligned openings of the two rings, labeled 20a and 20b in FIGS. 5 and 6. Using the bead 14, the loop 10 is then led around the ring 20b the through the opening of ring 20a, as shown in FIG. 6, and pulled taut. The tautness of the loop passed around the ring 20b tends to pull that ring into impingement with ring 20a, and clamps the loop 10 between the two rings, securing the assembly about the object 31. The object is secured tightly without recourse to knots or any form of knot-tying. Securing object 32 involves the same process.

Releasing the object 31 is just as simple a task as securing it. The rings 20a and 20b may be manually separated, freeing the loop 10 and permitting it to be removed from around ring 20b and pulled out of the openings of the two rings, thereby freeing the object 31. It should be noted that all the attachment tasks carried out by the rigging device of the invention are accomplished with the two legs of a loop 10 or 12, whereby the strength of the cord 9 is effectively doubled.

The rigging device 4 is constructed of a small number of simple components:
1) a small rectangle of strong fabric, approx. 4×7 in.;
2) a length of strong, supple cord, approx. 60 in (webbing is equivalent);
3) Four O-rings of plastic or metal, approx. 1" diameter;
4) Binding tape;
5) 2 hard plastic or metal beads or chocks, approx. ⅜" diameter.

These materials are easy to obtain and the construction of the assembly is simple and straightforward. The assembly may weigh as little as 25 grams, yet may secure loads up to 25 Kgm, which is a force/weight factor of approx. 1000.

Also, note that the fabric case or sleeve serves multiple purposes, even though it's construction is simple. The ends of cord 9 are secured within the sleeve 5 to form an endless loop. One leg of the endless loop slides through its respective passage in the sleeve, so that the loops 10 and 12 are mutually adjustable. And the two sets of paired rings 20 are secured by binding tape sewn to the sleeve, whereby the sleeve secures the rings and enables them to engage the adjacent loop and form a releasable engagement.

Likewise the bead 14 serves multiple purposes that interact synergistically with the cord 9 and paired rings 20. Not only does the sliding bead enable the user to extend a loop 10 or 12 and array the loop with two legs of equal length, it also serves as a convenient "handle" to engage the cord on which the bead is mounted. Moreover, the bead may comprise a failsafe feature: if the fastening arrangement shown in FIGS. 3 and 6 should slip and loosen, the bead 14 will be dragged into engagement with the impinging rings 20, and the larger diameter of the bead will not pass between the rings. Thus the fastening will not break free completely, allow the user to re-tie the rigging if necessary.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A rigging device for joining at least two objects, including:
   a flexible body having longitudinally opposed ends and including a pair of cord end loops, each cord loop extending from a respective one of the opposed ends;
   two pair of rings secured to said flexible body, each pair disposed in closely parallel fashion adjacent to one of said longitudinally opposed ends;
   a pair of beads, each including a passage therethrough to slidably engage a respective one of said cord end loops:
   wherein said cord end loops comprise longitudinally opposed end of a single unitary cord loop.

2. The rigging device of claim 1, wherein said flexible body includes a longitudinal sleeve having a pair of longitudinal passages extending therethrough, and said unitary cord loop includes opposed cord portions extending through said pair of longitudinal passages.

3. The rigging device of claim 2, wherein one of said opposed cord portions is slidably secured within its respective longitudinal passage, whereby portions of said unitary cord loop may be fed from one cord end loop to the other to adjust the size of the cord end loops.

4. The rigging device of claim 1, wherein said flexible body includes a longitudinal midpoint, and said two pairs of rings are each secured between said longitudinal midpoint and the adjacent longitudinally opposed end of said flexible body.

5. The rigging device of claim 4, wherein each pair of rings is secured by a band of binding tape sewn to said flexible body to secure said pair of rings in closely spaced but freely rotatable fashion.

6. The rigging device of claim 5, wherein said flexible body extends through the openings of said pairs of rings.

* * * * *